United States Patent [19]

Weingarten et al.

[11] 4,370,269
[45] Jan. 25, 1983

[54] MONOAZO PIGMENT DERIVED FROM ACETOACETYLAMINO BENZIMIDAZOLONE

[75] Inventors: Friedrich W. Weingarten, Liederbach am Taunus; Klaus Hunger; Ernst Klappert, both of Kelkheim am Taunus, all of Fed. Rep. of Germany

[73] Assignee: Hoechst Aktiengesellschaft, Frankfurt am Main, Fed. Rep. of Germany

[21] Appl. No.: 666,312

[22] Filed: Mar. 12, 1976

Related U.S. Application Data

[63] Continuation-in-part of Ser. No. 457,971, Apr. 4, 1974, abandoned.

[51] Int. Cl.³ ............... C09B 29/01; C09B 29/32; C09B 29/33; D06P 1/44
[52] U.S. Cl. ............... 260/157; 106/288 Q; 260/208
[58] Field of Search ............... 260/157

[56] References Cited

U.S. PATENT DOCUMENTS

| 3,109,842 | 11/1963 | Schilling et al. | 260/157 |
| 3,328,384 | 6/1967 | Dietz et al. | 260/157 |
| 3,555,003 | 1/1971 | Ribka | 260/157 |
| 3,609,135 | 9/1971 | Ribka | 260/152 |

Primary Examiner—Floyd D. Higel
Attorney, Agent, or Firm—Curtis, Morris & Safford

[57] ABSTRACT

The compound of the formula:

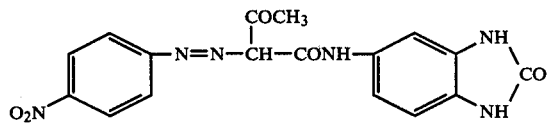

is a valuable pigment of high fastness properties and high covering power.

1 Claim, No Drawings

MONOAZO PIGMENT DERIVED FROM ACETOACETYLAMINO BENZIMIDAZOLONE

This is a continuation-in-part-application of our co-pending application Ser. No. 457,971 filed Apr. 4, 1974, now abandoned.

The present invention relates to a mono azo pigment of the formula:

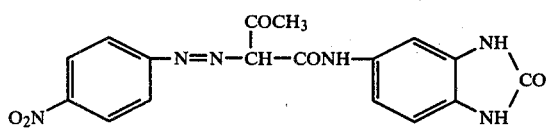

as well as to a process for preparing it by diazotizing p-nitro-aniline in known manner, coupling it with 5-acetoacetyl-amino-benzimidazolone and converting the crude pigment obtained into the desired pigment form by means of a thermal aftertreatment, preferably in the presence of a solvent.

The pigment may be prepared by combining the solution of the diazo compound with a fine, weakly acid dispersion of the coupling component, or alternatively by adding the alkaline solution of the coupling component to a solution of the diazo component which has been adjusted to pH 5-6 by means of sodium acetate. It is also possible to carry out the coupling reaction by simultaneously adding the solutions of the diazo and coupling components to a buffer mixture of sodium acetate and acetic acid.

According to all these methods, it may be advantageous to operate in the presence of cationic, anionic or non-ionic surface-active compounds. In order to obtain an optimum pigment form as regards grain softness, tinctorial strength, covering power and processability in lacquers and plastic materials, the pigment of the invention has to be subjected to a thermal aftertreatment. For this purpose, the aqueous pigment suspension may be treated in water at a temperature of from 80° to 150° C., i.e. where required under pressure, or in the presence of organic solvents, such as alcohols, lower carboxylic acids, carboxylic acid alkyl esters, aromatic hydrocarbons, chlorinated aromatic hydrocarbons, aprotic solvents, such as dimethylformamide, dimethylsulfoxide, pyridine, at a temperature of from 80° to 180° C. The above-cited organic solvents may also act on the dried untreated pigment in a pure form or in mixture with one another.

The azo pigment of the invention is obtained as an orange powder which is entirely insoluble in conventional solvents. It is distinguished by a high tinctorial strength, a brilliant shade, excellent covering power as well as by especially good fastness to light and weathering. Furthermore, the lacquers containing this pigment have a low viscosity. In this, it is superior to comparable azo pigments which are prepared with the same coupling component but contain, as the diazo component, a compound which is closely related to p-nitro-aniline. For example, the pigment of the invention is superior to corresponding pigments having 3-nitro-aniline, 2,4-dinitro-aniline, 4-chloro-aniline, 4-methyl-aniline or 4-methoxy-aniline as a diazo component, in its fastness to light and to weathering. As regards these two fastness properties, it is also superior to the azo pigments disclosed in German Pat. No. 1,227,585 and having 2-chloro-aniline, 2-methyl-aniline and 2-methoxy-aniline as a diazo component, while it is superior to the azo pigment having 2-nitro-aniline as the diazo component, in its covering power and in the brilliancy of the shade.

The novel azo pigment may be used for a variety of application fields, for example for the production of printing pastes, of color lakes and dispersion paints or for the coloration of natural rubber, plastic materials, natural and synthetic resins. It is further suitable for the pigment printing on a substrate, especially on a textile fiber, as well as on other flat structures, such as paper. The pigment may finally also be used for other purposes, for example for the dyeing of viscose rayon or cellulose ethers or esters, polyolefins, polyamides, polyurethanes, polyglycol terephthalates or polyacrylonitrile in the spinning solution or for the coloring of paper.

The following Examples serve to illustrate the invention.

EXAMPLE 1

13.8 Grams (0.1 mol) of p-nitro-aniline were stirred in 80 ml of 5 N hydrochloric acid. The mixture was cooled with ice to 0°–5° C. and diazotized by adding 20 ml of 5 N sodium nitrite beneath the surface of the mixture. Then kieselguhr was added, the mixture was stirred for 10 minutes and then filtered.

70 Grams of 5-acetoacetylamino-benzimidazolone (33% strength) were dissolved in 200 ml of water and 25 ml of 33% sodium hydroxide solution and then clarified by means of charcoal. A buffer solution was prepared from a mixture of 500 ml of water, 25 g of phosphoric acid, 30 ml of 33% sodium hydroxide solution and 10 ml of a 10% aqueous solution of a stearyl alcohol oxethylate (with 20 ethylene oxide units). At 22° C., the diazo solution and the solution of the coupling component were simultaneously added to this buffer solution which was then heated to 95° C., stirred for 1 hour at this temperature, suction-filtered and washed, 150 Grams of moist press cake were stirred with 140 g of isobutanol and 200 ml of water and maintained at 125° C. for 30 to 60 minutes in a closed vessel. After isobutanol had been expelled by means of steam and the residue had been suction-filtered, the drying operation yielded an orange-red pigment of excellent fastness to light and weathering, high covering power, good spreading capacity and high brilliancy, when incorporated in stoved enamel.

EXAMPLE 2

27.6 Grams (0.2 mol) of p-nitro-aniline were diazotized as disclosed in Example 1. The diazo solution and the coupling component were simultaneously added to a sodium acetate/glacial acetic acid buffer solution having the following composition: 1000 ml of water, 82 g of sodium acetate, 20 ml of glacial acetic acid and 10 ml of a 10% aqueous solution of a stearyl alcohol oxethylate having 20 ethylene oxide units. The mixture was heated to 95° C. and maintained at this temperature for 1 hour, then suction-filtered and washed with water.

The moist press cake containing about 25% of pigment was then finished as disclosed in Example 1 using isobutanol. The mixture was subjected to steam distillation and after a drying operation an orange-red pigment was obtained which had the same properties as disclosed for the pigment of Example 1.

EXAMPLE 3

13.8 Grams of p-nitro-aniline were diazotized and coupled with a solution of 24 g of 5-acetoacetylamino-benzimidazolone in 200 ml of water and 24 ml of sodium hydroxide solution by adding both solutions at about 20° C. to a buffer solution of 500 ml of water, 40 g of sodium acetate, 10 ml of glacial acetic acid and 10 ml of a 10% aqueous solution of an emulsifier obtained by the reaction of stearyl alcohol with 20 mols of ethylene oxide. Stirring was continued for 1 hour, the mixture was heated to 95° C., maintained at this temperature for 1 hour and suction-filtered.

125 g of moist press cake were heated in 200 ml of water to 125° C. for half an hour to 1 hour under pressure; the mixture was suction-filtered and washed with water. After drying, an orange-red pigment having very good fastness properties was obtained.

EXAMPLE 4

125 Grams of press cake (about 20% strength) were mixed by stirring with 96 g of o-dichlorobenzene and 100 ml of water, and the mixture was heated at 125° C. for 1 hour in a closed reactor. The pigment emulsion was then freed from o-dichlorobenzene by blowing in steam. After suction-filtration, washing and drying, an orange-red pigment having the same properties as in Example 1 was obtained.

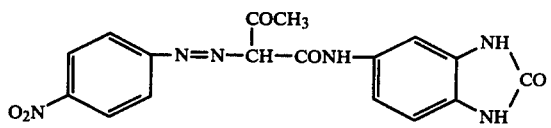

We claim:

1. The monoazo pigment of the formula: